(No Model.) 2 Sheets—Sheet 1.

E. L. ROSENFELD.
CHANGE GEAR FOR CYCLES.

No. 509,329. Patented Nov. 21, 1893.

WITNESSES:
George Baumann
S. C. Ennor

INVENTOR
Edward L. Rosenfeld
BY Howson and Howson
his ATTORNEYS.

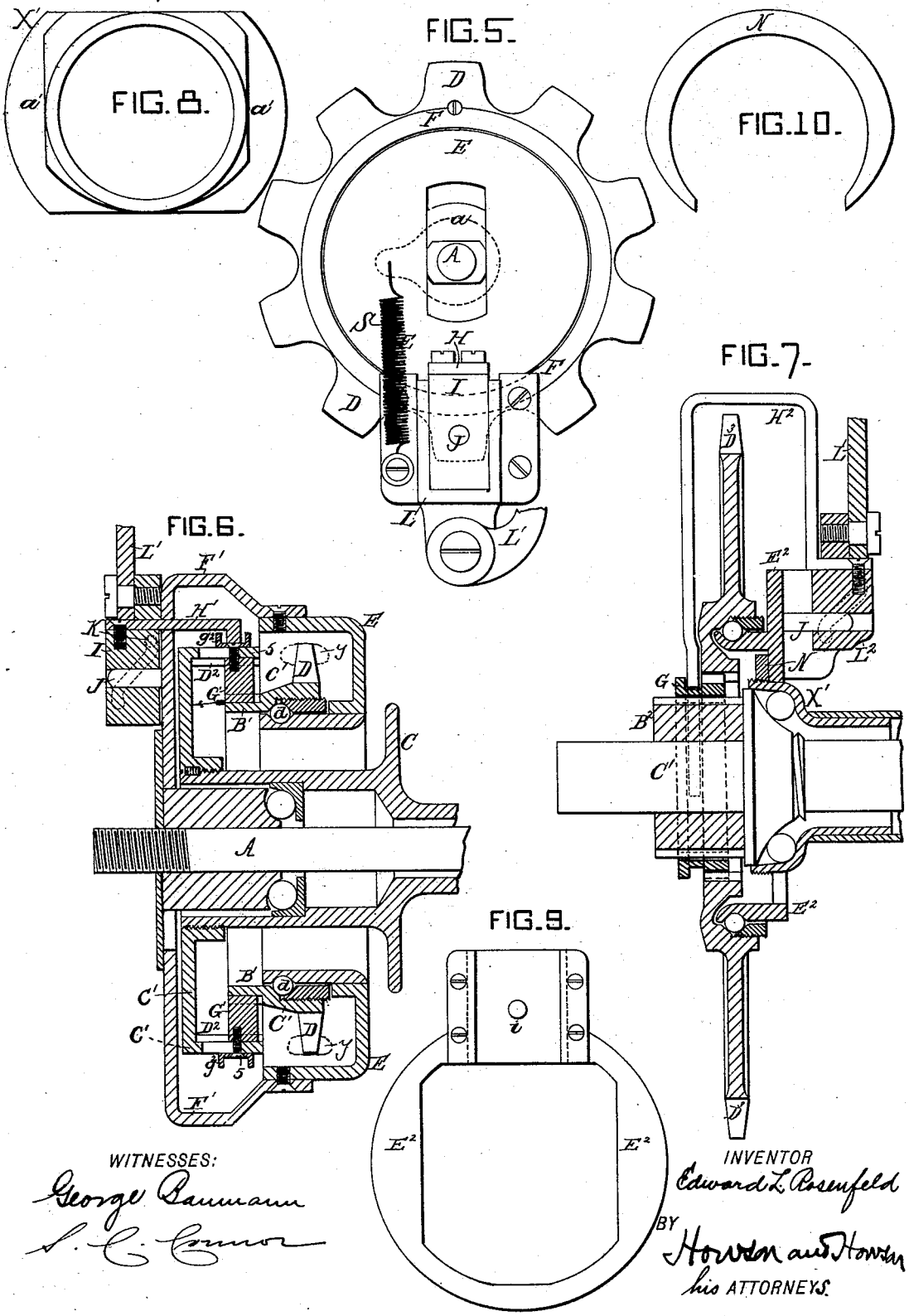

ical view of a modification. Fig. 7 is a
UNITED STATES PATENT OFFICE.

EDWARD L. ROSENFELD, OF NEW YORK, N. Y.

CHANGE-GEAR FOR CYCLES.

SPECIFICATION forming part of Letters Patent No. 509,329, dated November 21, 1893.

Application filed August 12, 1893. Serial No. 482,977. (No model.)

*To all whom it may concern:*

Be it known that I, EDWARD L. ROSENFELD, a citizen of the United States, and a resident of New York city, county of New York, and State of New York, have invented an Improved Change-Gear for Cycles, &c., of which the following is a specification.

The object of my invention is to construct a simple, compact, easily operated and reliable change gear, more especially adapted for use on cycles whereby the rider may change from speed to power or from power to speed, while his machine is in motion as well as when it is at rest.

The desirability of providing a construction or means whereby a change may be readily effected from speed to power or from power to speed is well understood among those familiar with the manufacture and use of cycles, and various mechanisms have been proposed for accomplishing this purpose.

While in the accompanying drawings I have shown my invention as applied to cycles of a prevailing type in which a chain and sprocket wheels are used, it should be understood at the outset that my improvements may be applied not only to cycles but also to various other machines in which a change gear is needed and also to almost any type of cycle.

Figure 1:
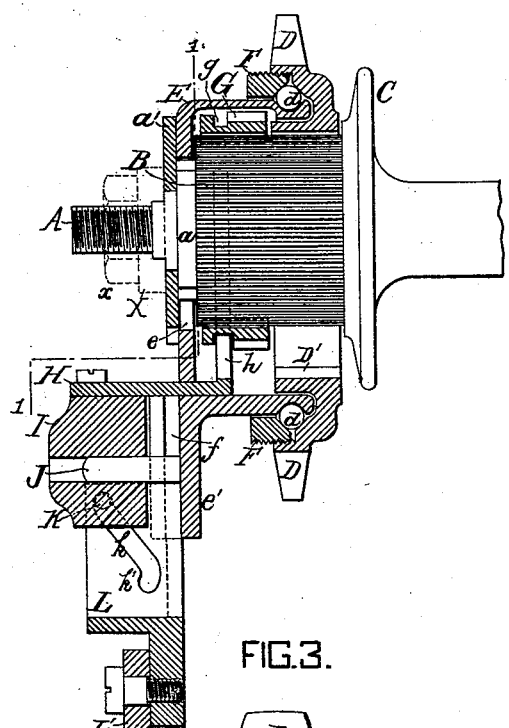
Figure 2:
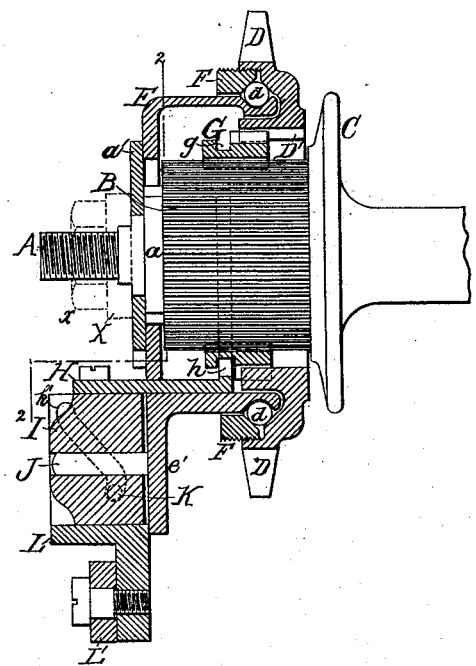
Figure 3:
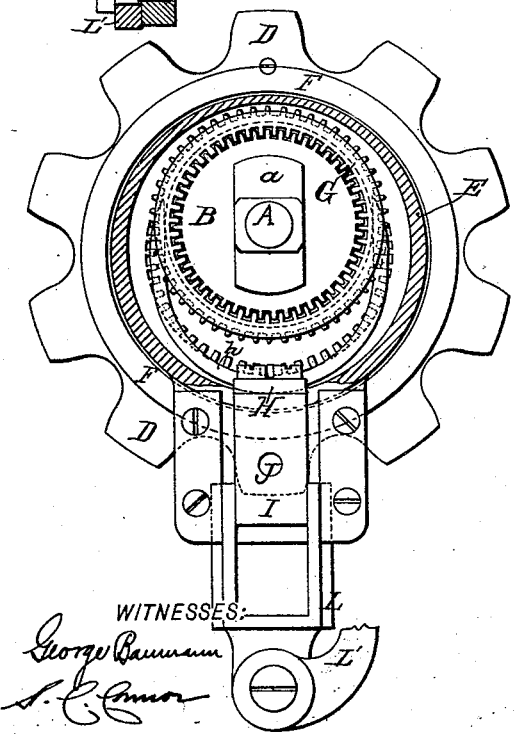
Figure 4:
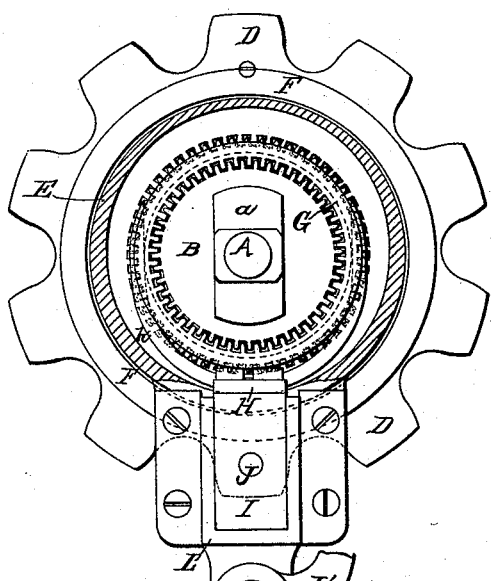

In the accompanying drawings, Figure 1 is a vertical section of one form of my invention as applied to the rear wheel of a bicycle. Fig. 2 is a corresponding view showing the movable parts in another position. Fig. 3 is a section on the line 1—1, Fig. 1. Fig. 4 is a section on the line 2—2, Fig. 2. Fig. 5 is a face view of the sprocket wheel to which my improvement is applied. Fig. 6 is a vertical sectional view of a modification. Fig. 7 is a similar view of another modification, showing my invention as applied to the crank axle of a cycle; and Figs. 8, 9 and 10 are views of parts thereof.

In the construction shown in Figs. 1 to 5, inclusive, and in the modification, Fig. 6, I have illustrated my invention as applied to the rear driving wheel of a cycle of that type in which the wheel is driven from the pedal shaft through a chain on the sprocket wheels. In the construction illustrated in Fig. 7, I have shown my invention as applied to the crank axle or pedal shaft of a cycle.

Referring to Figs. 1 to 5, C is a part of the hub of the rear wheel which turns upon the fixed axis or shaft A passing centrally through the hub and provided with ball bearings in any suitable or well-known manner, the opposite ends of this fixed shaft being secured to the frame X of the machine by nuts x or in any way that may be desirable. Instead, however, of fixing the sprocket wheel to the hub of the wheel of the machine as usual, I make the sprocket wheel D separate and movable and adapted to turn upon a movable bearing which in this case is a shell E preferably with intermediate ball bearings d held in place by a screw ring F, as shown in Figs. 1 and 2, or otherwise. I form upon or secure to the hub C of the wheel an elongated external gear B and upon the sprocket wheel D I form an internal gear D' of larger diameter but of narrower width than the external gear B upon the hub of the wheel. I fit to the elongated gear B, so as to slide freely thereon laterally, a locking ring G which has internal teeth adapted at all times to engage with the external teeth on the gear B. The ring has also external teeth and is of such thickness that when the sprocket wheel D is placed concentric with the gear B, the locking ring G can be moved inward laterally upon the gear B and fit between the external gear B upon the hub C and the internal gear in the sprocket wheel. The external teeth upon the locking ring G then engage with the said internal gear D', as shown in Figs. 2 and 4, so that then the sprocket wheel is locked to the hub of the wheel of the machine and the latter must move with the sprocket wheel and at the same speed. When the locking ring G is moved outward laterally to disengage it from the internal gear of the sprocket wheel the latter, with the shell on which it turns, may then be moved in a plane at right angles to the axis of the gear B (downward in the case illustrated) until the internal gear of the sprocket wheel meshes directly with the gear B of the hub of the wheel, as shown in Figs. 1 and 3, so that then motion is transmitted from the sprocket wheel to the wheel of the machine with an increase of speed.

In order that the shell E with its sprocket wheel may be moved in a plane at right angles to the axis of the wheel of the machine from the position shown in Fig. 1 to that shown in Fig. 2, or vice versa, but only to the desired extent, and this substantially at right angles to a line drawn through the axis of the front and rear axles of the machine (so that there may be no substantial change in the tension of the chain in the different positions of the sprocket wheel D), I provide upon the fixed axis or shaft A a projecting piece $a$ which enters a vertical slot $e$ in the shell E. Over this slot there is placed a shield or guard $a'$ carried by the projecting piece $a$ of the axis A within the frame of the machine.

In Fig. 5 the sprocket wheel D and connected parts are shown detached from the frame of the machine and the shield $a'$ removed.

Various constructions of devices may be employed for securing the lateral movement of the locking ring G and the up-and-down movement of the sprocket wheel or in other words the change from the concentric to the eccentric position of this sprocket wheel with reference to the gear on the hub of the wheel of the machine, but in all cases I make one movement of the operating device produce in proper succession the two movements of locking ring and sprocket wheel.

In the construction shown in Figs. 1 to 5 I have employed the following devices, which as a matter of convenience simply are arranged at the lower side of the hub of the wheel, although they may, in many instances, be placed equally well at the upper side: In the ring G there is formed a groove $g$ into which fits freely the fork $h$ of an arm H. This latter is carried by, or itself carries, a block I, which is further guided in its lateral movement by a horizontal pin J, carried by an extension $e'$ on the shell E. On the face of this extension $e'$ there are under-cut guides or grooves $f$ for the flanges of a vertical sliding piece L which is provided with cam slots $k$ to act upon lateral pins K carried by the block I. These cams or slots are such that when the slide L is moved down to its lowest position in this case, the block I and arm H will have moved outward laterally to disengage the locking ring G from the sprocket wheel D, and on the continued downward movement of the slide L, the latter will then carry with it the shell and sprocket wheel until the internal gear of the latter comes into engagement with the external gear B on the hub of the wheel of the machine, as illustrated in Figs. 1 and 3. On the other hand when the slide L is moved upward from the position shown in Figs. 1 and 3, the first action will be to raise the sprocket wheel from the eccentric to the concentric position, and disengage its internal gear from the external gear on the hub of the wheel of the machine, and then the locking ring G will, by the continued upward movement of the slide L be moved inward to lock the sprocket wheel D to the pinion B, as shown in Figs. 2 and 4.

I do not wish to limit myself to any special means for moving the slide L as various arrangements of rods, wires or levers may be provided. In the drawings I have indicated the lower end of a rod or lever L' as pivotally connected to a slide L, and this rod or lever L' may have any suitable or convenient connection with a handle at a point on the frame of the machine within reach of the rider, whereby he may, when riding the machine, as well as when the latter is at rest, operate the change gear, as already described, to change from power to speed or from speed to power, as may be desired.

In the modification illustrated in Fig. 6 I have shown a construction in which the gear on the hub of the wheel of the machine is made in the form of an internal gear, while the gear on the sprocket wheel is external. In this case the hub C of the wheel of the machine is extended through the movable shell E carrying the sprocket wheel D and has an outwardly extending flange C' terminating in an internal gear $D^2$. Within the latter is fitted the laterally movable locking ring G'. Upon the sprocket wheel D is formed an external gear B'.

In the view Fig. 6 I have shown the ring G' in a position locking the sprocket wheel to the gear $D^2$ on the hub of the wheel, but by moving the ring in the direction of the arrow in the figure, the locking ring may be moved out of contact with the gear B', and by moving the shell F' and its sprocket wheel vertically the gear B' may be caused to mesh with the internal gear $D^2$ on the hub of the wheel of the machine, giving in this case an increase of power by such change. The movements of the locking ring and shell carrying the sprocket wheel may be accomplished in various ways and in the drawings I have shown an adaptation of the means already described with reference to Figs. 1 to 5. The ring G' has at suitable points radial pins 5 passing through slots in the gear ring $D^2$ and connected to an exterior grooved ring $g^2$, which may be moved laterally upon the exterior of the gear $D^2$ by an arm H' similar to the arm H shown in Figs. 1 to 5. In this instance these operating devices are shown at the upper part of the device, instead of below.

The shell E, Fig. 6, is provided with slots $y$ for applying the sprocket chain.

In the modification shown in Fig. 7, I have illustrated how my invention may be applied to the crank axle of a cycle. In this case, there is provided upon the hub C' of the crank shaft an elongated gear $B^2$ upon which is fitted a laterally sliding locking ring G, which when moved inward as shown in Fig. 7, can lock the front sprocket wheel $D^3$ to the crank axle by engaging with an internal gear of the said sprocket wheel. The latter turns upon ball bearings on a shell $E^2$, which can be moved vertically at the proper time with reference to the fixed tubular part X' of the frame of the machine. This part X' is formed with a squared and flanged projecting portion $a^2$, Fig. 8 (similar to the part $a$ of the fixed axle in Figs 1 to 5) over which is fitted the slotted part $e^2$ of the shell $E^2$ (Fig. 9) permitting a guided and limited vertical movement of the latter upon the frame. On this shell $E^2$, which is retained in place laterally by the split lock nut N (Figs. 7 and 10), are the guides $i'$ for the cam slide (L) by which the block and arm $L^2$, $H^2$ are moved laterally and the sprocket wheel moved verically in a manner similar to that already described with reference to Figs. 1 to 5. As will be seen, the arm $H^2$ in this case is in the form of a loop to pass over the top of the sprocket wheel $D^3$.

By the term "shell," as here used, I do not wish to be understood as necessarily limiting myself to a part absolutely shell-like in shape. I use the term simply as a convenient description of the movable part carrying the movable wheel and gear.

When the means employed for moving the locking ring and the shell carrying the chain wheel embrace the use of the cam-slotted slide L, and arm H, I prefer to make the cam slots $k$ with their opposite ends slightly reversed as at $k'$, Figs. 1 and 2, in order that when the locking ring G has been moved to either of its two extreme positions by the arm H, the latter will then be moved by the reverse $k'$ slightly in the opposite direction to then free the forked end of the arm H from frictional contact with either wall of the groove $g$ in the ring G. I prefer to employ a spring S (Fig. 5) connected at one end to the frame and at the other to the shell E to normally tend to return the shell E to a position with the chain wheel concentric with the gear on the hub.

It will be seen that the levers, &c., under the control of the rider to operate the gear as hereinbefore described may be so manipulated as to disengage the gear on the hub of the cycle wheel or pedal shaft without throwing the locking ring into place between the two gears. Then the cycle wheel would be free—a condition suitable for "coasting" on down grades.

I claim as my invention—

1. A cycle having a frame and a sprocket wheel provided with a gear in combination with a rotating hub or shaft having a gear, a locking device laterally movable with reference to the two gears, and means for moving said sprocket wheel substantially vertically to either mesh or operate the locking device to lock said two gears together, substantially as and for the purpose described.

2. A cycle having a frame and a sprocket wheel provided with a gear in combination with a hub or shaft having a gear, one of the gears being internal and the other external, a locking device laterally movable with reference to the two gears, and means for moving said sprocket wheel substantially vertically to either mesh or operate the locking device to lock said two gears together, as and for the purpose described.

3. A cycle having a frame and a bearing carrying a sprocket wheel provided with a gear in combination with a rotating hub or shaft having a gear, a locking device for the gears and means for moving, by a single movement but in successive order, both the sprocket wheel and locking device, the sprocket wheel substantially vertically and the locking device laterally, to either mesh or lock said two gears together, substantially as and for the purpose described.

4. A change gear comprising two gear wheels, one elongated and one having external teeth and the other internal teeth, and means for moving one into and out of gear with the other, in combination with a locking ring fitted upon the elongated gear to slide laterally thereon and means for moving it between the two gears to lock them together, all substantially as described.

5. A change gear comprising a fixed frame, a movable bearing and two gears, one external and the other internal and one carried by the frame and the other by the bearing with means for moving the bearing to bring the two gears into and out of engagement with each other and a movable locking ring having internal and external teeth adapted to be interposed between the two gears to lock them together, substantially as described.

6. A cycle having a frame, a rotating hub carried thereby and having a gear in combination with a bearing movable on the said frame and carrying a wheel provided with a gear, the said gears being one external and the other internal, means for moving said bearing to bring the two gears into or out of engagement with each other and a movable locking ring having internal and external teeth adapted to be interposed between the two gears to lock them together, substantially as described.

7. A cycle having a frame, a rotating hub carried thereby and having a gear in combination with a movable bearing carrying a wheel provided with a gear, the said gears being one external and the other internal, means for moving said bearing in a plane at right angles to the axes of the gears to throw them into gear with each other or out of gear and concentric, a locking ring carried by the rotating hub and means for interposing the said ring between the two gears when they are concentric, substantially as described.

8. A cycle having a frame, a rotating hub carried thereby and having a gear in combination with a bearing adapted to have a limited and guided movement substantially vertically upon the frame, a sprocket wheel carried by the bearing and provided with a gear, the said two gears being one internal and the other external, means for moving the bearing to bring the gears into or out of gear with each other, a locking ring and means for interposing the latter between the two gears to lock them together, substantially as described.

9. A cycle having a frame, a hub carried thereby and having a gear in combination with a movable bearing carrying a wheel with a gear, the said two gears being one external and the other internal, a locking ring to be interposed between the two gears, and devices substantially as described connected to the said shell and ring, to move the bearing and its gear in a plane at right angles to the axes of the gears and to move the ring between and from between the gears, substantially as and for the purpose set forth.

10. A cycle having a frame, with a fixed axle, a wheel rotating thereon and having a hub with an elongated gear in combination with a bearing free to have a limited and guided movement on the fixed axle, a sprocket wheel turning on the bearing and carrying a gear adapted to engage with and be disengaged from the gear on the hub and a locking ring to be interposed between the gears to lock them together, substantially as described.

11. A cycle having a frame, a hub provided with a gear, a bearing movable on the frame and carrying a wheel provided with a gear and a locking ring adapted to be interposed between the gears, of which one is external and the other internal, in combination with a slide under control of the rider and connected to the shell, a movable arm connected to the locking ring and a cam connection between the said slide and arm, all substantially as and for the purpose described.

In testimony whereof I have signed my name to this specification in the presence of two subscribing witnesses.

EDWARD L. ROSENFELD.

Witnesses:
W. J. MORGAN,
S. H. MORGAN.